(12) United States Patent
Swanson (10) Patent No.: US 8,403,658 B2
(45) Date of Patent: Mar. 26, 2013

(54) CONSUMABLE ASSEMBLY FOR USE IN EXTRUSION-BASED LAYERED DEPOSITION SYSTEMS

(75) Inventor: William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 131 days.

(21) Appl. No.: 12/811,411

(22) PCT Filed: Jan. 7, 2009

(86) PCT No.: PCT/US2009/000052
§ 371 (c)(1), (2), (4) Date: Jul. 1, 2010

(87) PCT Pub. No.: WO2009/088995
PCT Pub. Date: Jul. 16, 2009

(65) Prior Publication Data
US 2010/0283172 A1 Nov. 11, 2010

Related U.S. Application Data

(60) Provisional application No. 61/010,399, filed on Jan. 8, 2008.

(51) Int. Cl.
*B29C 41/02* (2006.01)
(52) U.S. Cl. ............ 425/190; 425/376.1; 425/377; 264/308
(58) Field of Classification Search ......... 264/308; 425/190, 376.1, 377; 206/204
See application file for complete search history.

(56) References Cited

U.S. PATENT DOCUMENTS

| | | |
|---|---|---|
| D71,171 S | 10/1926 | C.C. Bonn |
| D79,201 S | 8/1929 | W.C. Mills |
| 1,906,495 A | 5/1933 | Stine |
| 3,358,943 A | 12/1967 | Pelson |
| D224,683 S | 8/1972 | Wada et al. |
| D228,789 S | 10/1973 | Koni |
| D230,703 S | 3/1974 | Nelson |
| D230,991 S | 3/1974 | Catto et al. |
| D233,411 S | 10/1974 | Geisler |
| D260,514 S | 9/1981 | Gell |
| 4,387,863 A | 6/1983 | Edmonston et al. |
| D276,527 S | 11/1984 | Flanigan |
| D282,357 S | 1/1986 | Gell |
| 4,657,203 A | 4/1987 | Crawford |
| 5,121,329 A | 6/1992 | Crump |
| D343,319 S | 1/1994 | Phillips |
| D346,379 S | 4/1994 | Patel et al. |
| 5,340,433 A | 8/1994 | Crump |
| 5,503,785 A | 4/1996 | Crump et al. |
| D381,645 S | 7/1997 | Johnson |

(Continued)

FOREIGN PATENT DOCUMENTS

| | | |
|---|---|---|
| FR | 2902681 A1 | 12/2007 |
| GB | 551992 A | 3/1943 |

(Continued)

OTHER PUBLICATIONS

Chinese Office Action dated Apr. 19, 2012 from Chinese Patent Application No. 200980101836.8, filed Jan. 7, 2009.

(Continued)

*Primary Examiner* — Galen Hauth
(74) *Attorney, Agent, or Firm* — Brian R. Morrison; Westman, Champlin & Kelly, P.A.

(57) ABSTRACT

A consumable assembly comprising a container portion configured to retain a supply of filament, a guide tube connected to the container portion, and a pump portion connected to the guide tube.

22 Claims, 13 Drawing Sheets

U.S. PATENT DOCUMENTS

| | | | |
|---|---|---|---|
| D406,049 S | 2/1999 | Bernat | |
| D408,720 S | 4/1999 | Sheng | |
| 5,939,008 A | 8/1999 | Comb et al. | |
| 5,968,561 A | 10/1999 | Batchelder et al. | |
| 6,022,207 A | 2/2000 | Dahlin et al. | |
| 6,070,107 A | 5/2000 | Lombardi et al. | |
| 6,085,957 A | 7/2000 | Zinniel et al. | |
| D436,021 S | 1/2001 | Arnold | |
| D436,111 S | 1/2001 | Hahn et al. | |
| 6,228,923 B1 | 5/2001 | Lombardi et al. | |
| D470,498 S | 2/2003 | Argumedo et al. | |
| D474,191 S | 5/2003 | Nakayama | |
| 6,685,866 B2 | 2/2004 | Swanson et al. | |
| 6,715,710 B1 | 4/2004 | Russell et al. | |
| 6,722,872 B1 | 4/2004 | Swanson et al. | |
| D491,048 S | 6/2004 | Cornier et al. | |
| 6,776,602 B2 | 8/2004 | Swanson et al. | |
| 6,790,403 B1 | 9/2004 | Priedeman, Jr. et al. | |
| 6,991,197 B2 | 1/2006 | Cox et al. | |
| 7,063,285 B1 | 6/2006 | Turley et al. | |
| 7,169,337 B2 | 1/2007 | Swanson et al. | |
| 7,297,304 B2 | 11/2007 | Swanson et al. | |
| D557,118 S | 12/2007 | Linginfelter et al. | |
| 7,341,214 B2 | 3/2008 | Taatjes et al. | |
| 7,384,255 B2 | 6/2008 | LaBossiere et al. | |
| D595,121 S | 6/2009 | Murphy | |
| D598,733 S | 8/2009 | Taatjes et al. | |
| D598,922 S | 8/2009 | Taatjes et al. | |
| D606,845 S | 12/2009 | Taatjes et al. | |
| D606,998 S | 12/2009 | Taatjes et al. | |
| 7,996,101 B2 | 8/2011 | Menchik et al. | |
| 2003/0011103 A1 | 1/2003 | Swanson et al. | |
| 2004/0129823 A1 | 7/2004 | Swanson et al. | |
| 2005/0173855 A1 | 8/2005 | Dunn et al. | |
| 2006/0076454 A1 | 4/2006 | Kawada | |
| 2007/0001050 A1 | 1/2007 | Taatjes et al. | |
| 2007/0228590 A1 | 10/2007 | LaBossiere et al. | |

FOREIGN PATENT DOCUMENTS

| | | |
|---|---|---|
| GB | 2079247 A | 1/1982 |
| GB | 2438394 A | 11/2007 |

OTHER PUBLICATIONS

International Search Report of PCT/US09/00052, filed Jan. 7, 2009.
Russian Office Action dated Jun. 27, 2012 from Russian Patent Application No. 2010133228, filed Jan. 7, 2009.
Russian Decision on Grant dated Nov. 21, 2012 from Russian Patent Application No. 2010133228, filed Jan. 7, 2009.
Chinese Office Action dated Jan. 11, 2013 from Chinese Patent Application No. 200980101836.8, filed Jan. 7, 2009.

CONSUMABLE ASSEMBLY FOR USE IN EXTRUSION-BASED LAYERED DEPOSITION SYSTEMS

CROSS-REFERENCE TO RELATED APPLICATION(S)

This application is the national phase of International Patent Application No. PCT/US2009/000052, filed on Jan. 7, 2009, which claims priority to U.S. Provisional Patent Application No. 61/010,399, filed on Jan. 8, 2008, both of which are entitled "Consumable Assembly For Use In Extrusion-Based Layered Deposition Systems", and the disclosures of which are incorporated by reference in their entireties.

BACKGROUND

The present invention relates to extrusion-based layered deposition systems for building three-dimensional (3D) objects with rapid prototyping/manufacturing techniques. In particular, the present invention relates to consumable materials for use in extrusion-based layered deposition systems.

An extrusion-based layered deposition system (e.g., fused deposition modeling systems developed by Stratasys, Inc., Eden Prairie, Minn.) is used to build a 3D object from a computer-aided design (CAD) model in a layer-by-layer manner by extruding a flowable build material. The build material is extruded through an extrusion tip carried by an extrusion head, and is deposited as a sequence of roads on a substrate in an x-y plane. The extruded build material fuses to previously deposited build material, and solidifies upon a drop in temperature. The position of the extrusion head relative to the substrate is then incremented along a z-axis (perpendicular to the x-y plane), and the process is then repeated to form a 3D object resembling the CAD model.

Movement of the extrusion head with respect to the substrate is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited from a second nozzle pursuant to the generated geometry during the build process. The support material adheres to the build material during fabrication, and is removable from the completed 3D object when the build process is complete.

SUMMARY

The present invention relates to a consumable assembly for building 3D objects with an extrusion-based layered deposition system. The consumable assembly includes a container portion configured to retain a supply of filament, a guide tube connected to the container portion, and a pump portion connected to the guide tube, and configured to extrude a material of the filament in a flowable state.

DETAILED DESCRIPTION

Figure 1:
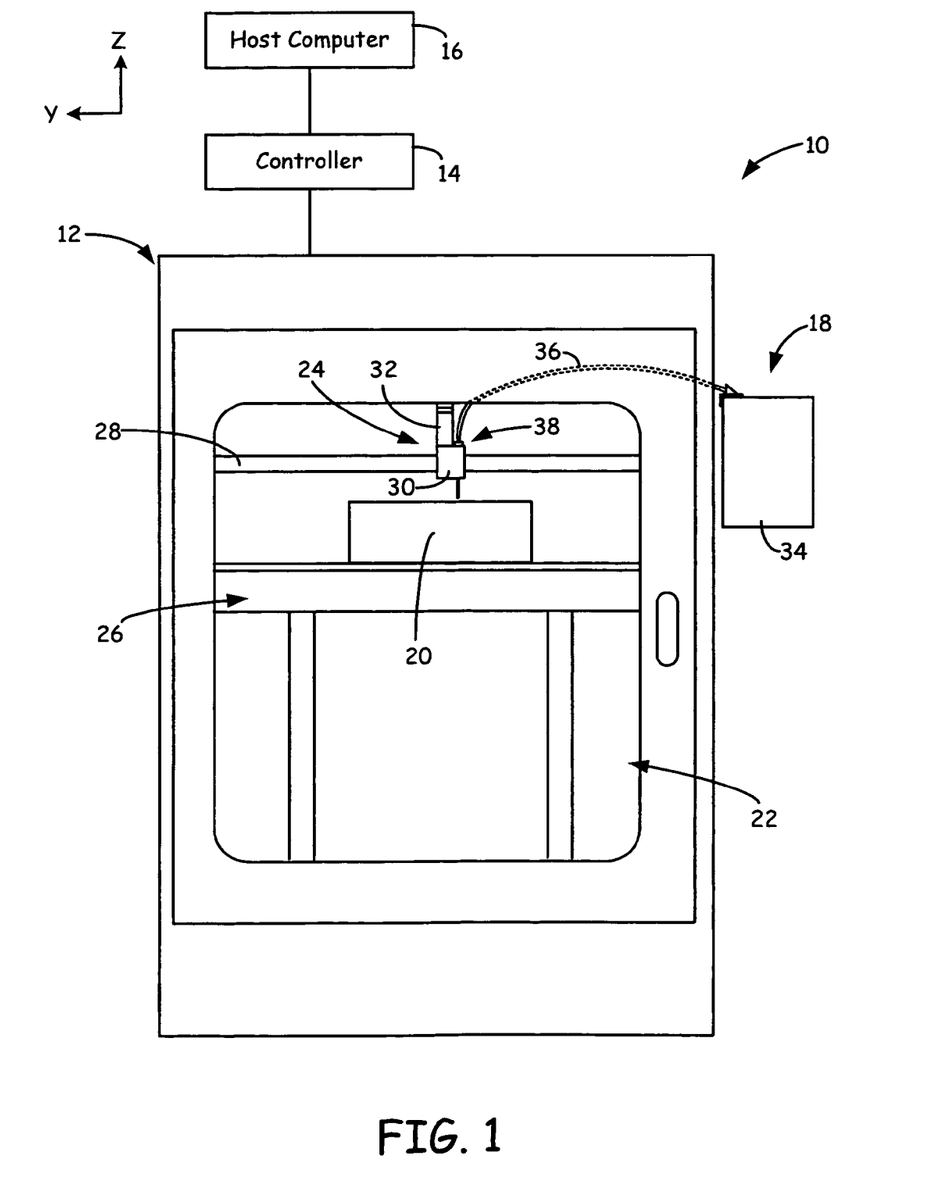
FIG. 1 is a front perspective view of a unit for building 3D objects with a consumable assembly.

FIG. 1 is a front view of unit 10 for building 3D objects with one or more consumable assemblies, where the consumable assemblies may be discarded or recycled after use. Unit 10 includes system 12, controller 14, host computer 16, and consumable assembly 18, where system 12 is an extrusion-based layered manufacturing system for building 3D objects (e.g., 3D object 20). Suitable systems for system 12 include fused deposition modeling systems developed by Stratasys, Inc., Eden Prairie, Minn. Controller 14 is a computer-operated controller in signal communication with system 12 and host computer 16 for controlling system 12. Host computer 16 is a computer-based system that interacts with system 12 via controller 14 to build 3D object 20. Host computer 16 generates the build data from a CAD model (not shown) corresponding to 3D object 20, and relays the build data to controller 14.

System 12 includes build chamber 22, extrusion head assembly 24, and substrate assembly 26. Build chamber 22 is a build environment that contains extrusion head assembly 24, substrate assembly 26, and at least a portion of consumable assembly 18 for building 3D object 20 with a build material supplied from consumable assembly 18. For fused deposition modeling, build chamber 22 is desirably heated to an elevated temperature to increase build efficiencies and to reduce distortions in 3D object 20.

Extrusion head assembly 24 includes x-y gantry 28, extrusion mount 30, and drive motor 32. Extrusion mount 30 retains a portion of consumable assembly 18 during a build operation, and is supported by x-y gantry 28. Drive motor 32 is a motor that engages consumable assembly 18 during the build operation for extruding the build material from consumable assembly 18 based on signals provided from controller 14. In this embodiment, drive motor 32 is also supported by extrusion mount 30. Accordingly, during the build operation, controller 14 directs x-y gantry to move extrusion mount 30 and drive motor 32 around build chamber 22 in a horizontal x-y plane, and directs drive motor 32 to extrude the build material from consumable assembly 18. This selectively deposits the build material to form 3D object 20 in a layer-by-layer manner on substrate assembly 26. Substrate assembly 26 is a moveable platform, such as the platform disclosed in Dunn et al., U.S. Publication No. 2005/0173855. Accordingly, controller 14 directs substrate assembly 26 incrementally move along a z-axis during a build process, thereby allowing successive layers of 3D object 20 to be built.

Consumable assembly 18 is a disposable assembly that include a supply of build material in a filament form (not shown in FIG. 1), and also includes one or more components required to extrude the build material filament. As shown, consumable assembly 18 includes container portion 34, guide tube 36, and pump portion 38. While container portion 34 of consumable assembly 18 is illustrated in FIG. 1 as being positioned at an offset location relative to system 12, container portion 34 is desirably mounted in a loading bay of system 12 (not shown), thereby allowing container portion 34 to be securely retained to system 12. Container portion 34 is the portion of consumable assembly 18 that includes the supply of the build material filament.

Guide tube 36 is a flexible tube that interconnects container portion 34 and pump portion 38, and guides the build material filament from container portion 34 to pump portion 38. Pump portion 38 is the portion of consumable assembly 18 that is retained by extrusion mount 30, and engages with drive motor 32. As discussed below, pump portion 38 includes a drive mechanism (not shown in FIG. 1) and a liquefier (not shown in FIG. 1), where drive motor 32 engages with the drive mechanism to feed successive portions of the filament to the liquefier. The successive portions of the filament are then melted within the liquefier and extruded from pump portion 38 to build 3D object 20 on substrate assembly 26.

As discussed above, consumable assembly 18 may be discarded, recycled, or otherwise handled after the supply of the build material filament is emptied from container portion 34. After consumable assembly 18 is depleted, pump portion 38 is removed from extrusion mount 30 and consumable assembly 18 is removed from the loading bay of system 12. A new consumable assembly 18 may then be mounted in the loading bay, and the pump portion 38 of the new consumable assembly 18 may be inserted into extrusion mount 30 for a subsequent build operation. As discussed below, the use of consumable assembly 18 removes several of the components from system 12 that may degrade or otherwise have reduced efficiencies over multiple extrusion runs (e.g., liquefier tubes, filament drive mechanisms, and extrusion tips). This allows new components to be used with each consumable assembly 18 that is loaded into system 12.

In an alternative embodiment, system 12 may be a component of a machine (not shown) that performs non-rapid prototyping/manufacturing processes. For example, system 12 may be part of a machine that performs milling or sheet metal forming, where system 12 is configured to deposit layers of the build material onto one or more portions of the milled/formed parts. Accordingly, system 12 may be part of a larger assembly system that performs multiple steps to form parts in a continuous or batch manner.

Figure 2:
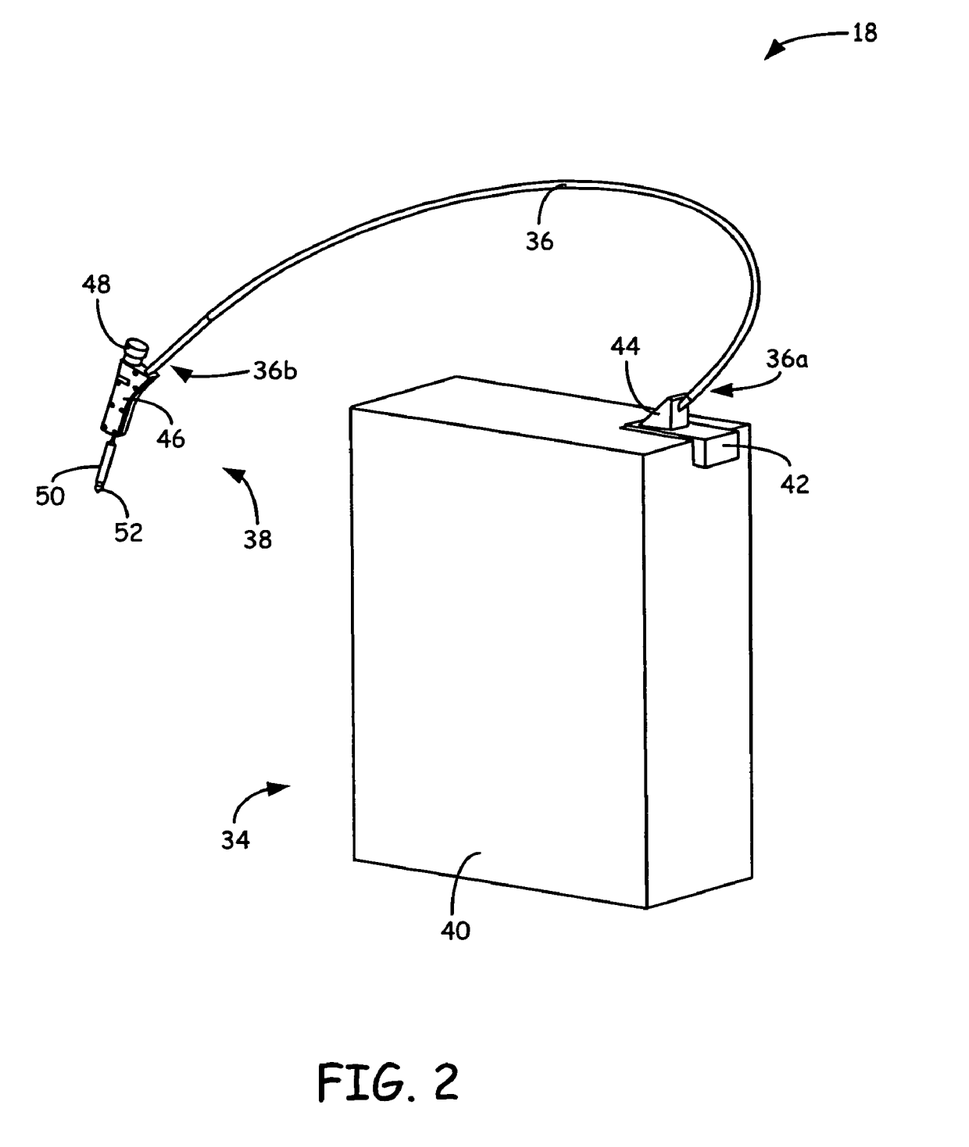
FIG. 2 is a front perspective view of a consumable assembly.
Figure 3:
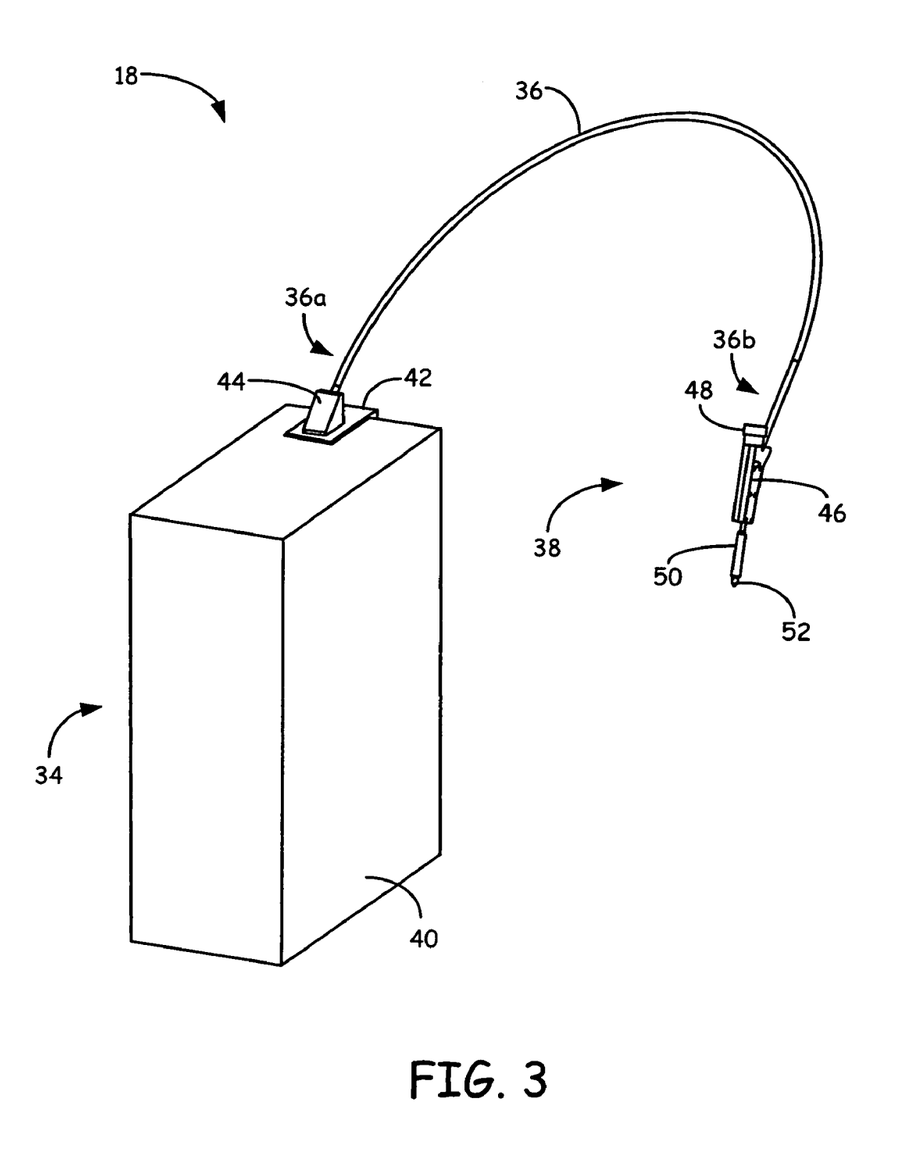
FIG. 3 is a rear perspective view of the consumable assembly.

FIGS. 2 and 3 are respectively front and rear perspective views of consumable assembly 18. As shown, container portion 34 of consumable assembly 18 includes outer casing 40, data chip 42, and tube connector 44. Outer casing 40 is an encasement structure that retains the supply of the build material filament (not shown in FIG. 2 or 3). Outer casing 40 is desirably a rigid or partially-rigid structure to protect the retained filament from physical damage (e.g., during transit). While outer casing 40 is shown as a rectangular package, outer casing 40 may alternatively exhibit a variety of different geometric shapes (e.g., cylindrical) to accommodate a variety of different loading bays for system 12 (shown in FIG. 1). Due to the consumable nature of consumable assembly 18, outer casing 40 is desirably fabricated from one or more lost-cost materials that may discarded or recycled. Examples of suitable materials for outer casing 40 include polymeric materials (e.g., polyethylenes), thin-film metals (e.g., aluminum-based sheets and foils), paper-based materials (e.g., paper, cardboard, and boxboard), and combinations thereof. In one embodiment, outer casing 40 is a package commercially available under the trademark "TETRA PAK" from Tetra Pak International SA, Switzerland.

Data chip 42 is an integrated circuit chip that engages with a data reader located in the loading bay of system 12. This allows system 12 to determine the type and amount of build material filament that remains in consumable assembly 18. Data chip 42 is also suitable for measuring the amount of filament fed to system 12 from container portion 34 during a build operation. Suitable integrated circuit chips for data chip 42, and suitable techniques for using the integrated circuit chips, include those disclosed in Swanson et al., U.S. Pat. No. 6,776,602. Tube connector 44 is a connection point that is secured to guide tube 36, thereby allowing the build material filament to be fed to guide tube 36. In one embodiment, outer casing 40, tube connector 44, and guide tube 36 provide a moisture seal that prevents the transmission of moisture from external environments to locations within container portion 34 or guide tube 36. This allows moisture-sensitive build materials to be used for building 3D objects (e.g., 3D object 20).

Guide tube 36 is a flexible tube that includes first end 36a and second end 36b for interconnecting container portion 34 and pump portion 38. As shown, first end 36a is connected to tube connector 44, and second end 36b is connected to pump portion 38. Guide tube 36 desirably has a length between first end 36a and second end 36b that allows pump portion 38 to move around in a horizontal x-y plane within build chamber 22 of system 12 (shown in FIG. 1) while container portion 34 is mounted in the loading bay of system 12. Additionally, guide tube 36 is desirably flexible enough to allow pump portion 38 to move around in the horizontal x-y plane within build chamber 22 without substantial biasing resistance. Examples of suitable materials for guide tube 36 include polyethylenes, polyvinylchlorides, fluoropolymers, polyamides, nylons, and combinations thereof. In embodiments in which build chamber 22 is heated during the build operation, guide tube 36 is also desirably thermally resistant to the temperature of build chamber 22, thereby preventing guide tube from thermally degrading during the build operation. As discussed below, in some embodiments, guide tube 36 may include electrical connections for one or more components of pump portions 38 (e.g., for heaters, temperature sensors, and drive motors).

Pump portion 38 is the extruder portion of consumable assembly 18, and includes casing 46, drive mechanism 48, liquefier region 50, and extrusion tip 52. Casing 46 is a protective casing secured to guide tube 36 for retaining guide tube 36 to pump portion 38. Drive mechanism 48 is a filament drive mechanism that engages with drive motor 32 (shown in FIG. 1) (e.g., a worm gear). Liquefier region 50 is the region in which the build material filament is melted via a thermal profile along the length of the liquefier region 50. Extrusion tip 52 is the component of pump portion 38 through which the melted build material extrudes to build 3D object 20. Pump portion 38 desirably exhibits dimensions that match the internal dimensions of extrusion mount 30 (shown in FIG. 1). This allows pump portion 38 to be readily installed in extrusion mount 30 (shown in FIG. 1) without extensive installation and calibration requirements. In one embodiment, pump portion 38 also includes an electrical connection, thereby allowing liquefier region 50 to receive electrical power from system 12.

During a build operation, drive motor 32 causes drive mechanism 48 to feed successive segments of the build material filament from container portion 34, through guide tube 36, and into liquefier region 50. While passing through liquefier region 50, the build material filament melts, and is extruded through extrusion tip 52. While the build material filament melts within liquefier region 50, the successive segments of the build material filament function as a piston to press the melted build material through liquefier region 50 and extrusion tip 52. When the build operation is complete, drive motor 32 and drive mechanism 48 stop feeding the successive segments of the build material filament. At this point, if consumable assembly 18 is ready for removal, pump head 38 is removed from extrusion mount 30, and consumable assembly 18 is removed from the loading bay of system 12. Consumable assembly 18 may then be discarded, recycled, or otherwise handled.

Figure 4:
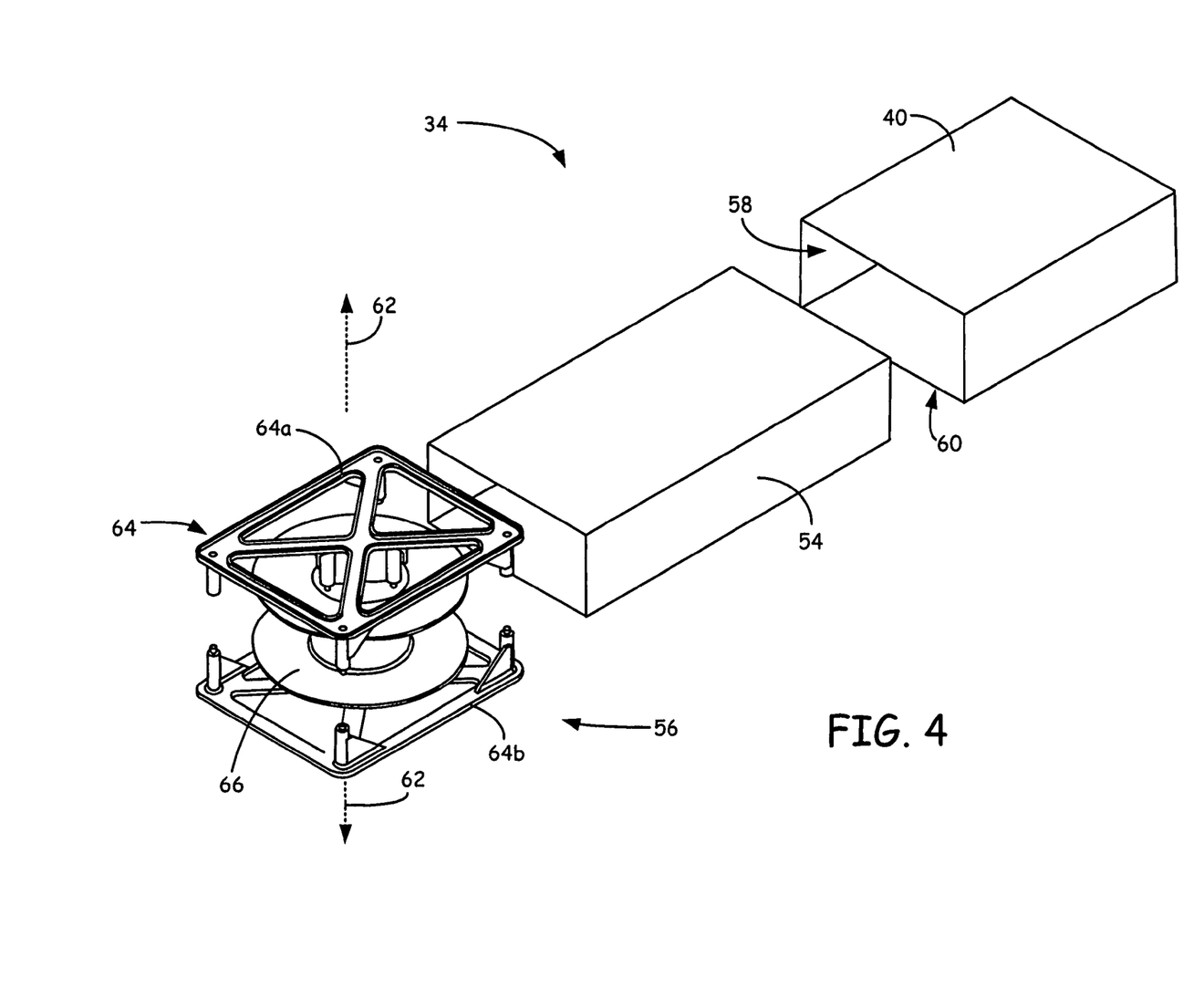
FIG. 4 is an exploded perspective view of a container portion of the consumable assembly.

FIG. 4 is an exploded perspective view of container portion 34, which further includes liner 54 and spool assembly 56. As shown, outer casing 40 includes interior region 58 and bottom opening 60, where bottom opening 60 is an enclosable opening through which liner 54 and spool assembly 56 may be inserted, thereby retaining liner 54 and spool assembly 56 within interior region 58. Liner 54 is a moisture-sealing barrier that is disposed within outer casing 40. Suitable materials for liner 54 include polymeric materials, metal foils, and combinations thereof. In alternative embodiments, outer casing 40 and liner 54 may be replaced with one or more layers that provides structural integrity and/or moisture resistance.

Spool assembly 56 is shown in an exploded view along axis 62, and includes spool frame 64 and filament spool 66. Spool frame 64 includes frame components 64a and 64b, which may be secured together on opposing sides of filament spool 66 to rotatably secure filament spool 66 therebetween. Filament spool 66 is a rotatable spool that contains a supply of the build material filament for building 3D object 20. During assembly of consumable assembly 18, the build material filament is wound onto filament spool 66, and filament spool 66 is rotatably secured within spool frame 64. A portion of the build material filament is then fed through liner 54 and outer casing 40, and into tube connector 44 (shown in FIGS. 2 and 3) and guide tube 36 (shown in FIGS. 2 and 3). Spool assembly 56 is then inserted within liner 54 and outer casing 40. In one embodiment, interior region 58 of outer casing 40 is dried to substantially remove moisture from within interior region 58. This may be performed by placing consumable assembly 18 in a dry environment (e.g., a dry-air oven), and/or with the use of desiccant packages inserted within container portion 34. Additionally, a dry inert gas (e.g., argon and nitrogen) may be introduced into interior region 58. Liner 54 and outer casing 40 are then sealed closed to prevent moisture from entering container portion 34 during transportation and storage.

In alternative embodiments, the filament may be provided in non-spooled arrangements. In these embodiment, spool assembly 56 may be omitted, and alternative filament supply structures may be used depending on the filament packing arrangement. In further alternative embodiments, the filament may be coiled or bundled in container portion 34 without the use of filament supply structures.

Figure 5:
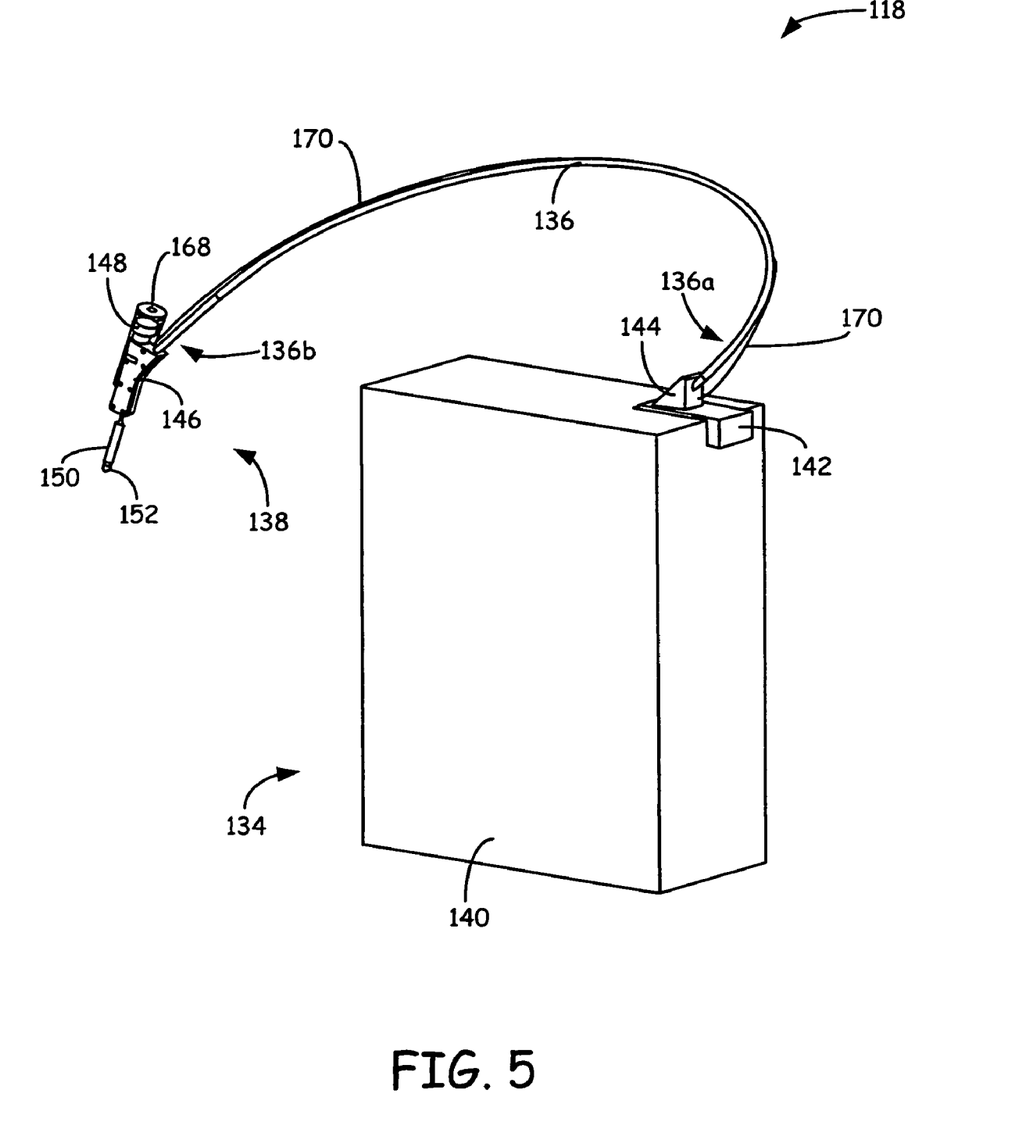
FIG. 5 is a front perspective view of a first alternative consumable assembly, which includes a drive motor.

FIG. 5 is a front perspective view of consumable assembly 118, which is an alternative embodiment to consumable assembly 18, and respective reference labels are increased by "100". In this embodiment, pump portion 138 further includes drive motor 168, which is secured to casing 146 and is engaged with drive mechanism 148. As such, drive motor 168 may be used in lieu of drive motor 32 (shown in FIG. 1), and drive motor 32 may be omitted from system 12 (shown in FIG. 1). Accordingly, in this embodiment, drive motor 168 is a component of consumable assembly 18, and may be discarded or recycled with consumable assembly 18 after use.

As further shown in FIG. 5, consumable assembly 118 also includes electrical connection 170, which extends along guide tube 136 and interconnects container portion 134 and pump portion 138. In this embodiment, the data reader located in the loading bay of system 12 may also provide power to data chip 142, which may correspondingly relay the electrical power from system 12 to pump portion 138 via electrical connection 170. Accordingly, one or more components of pump portion 138 (e.g., liquefier region 150 and drive motor 168) may be powered in this manner. In this embodiment, controller 14 (shown in FIG. 1) also provides command signals for drive motor 168 through data chip 142 and electrical connection 170. The use of drive motor 168 and electrical connection 170 increases the ease of operation when installing and using consumable assembly 118 with system 12.

Figure 6:
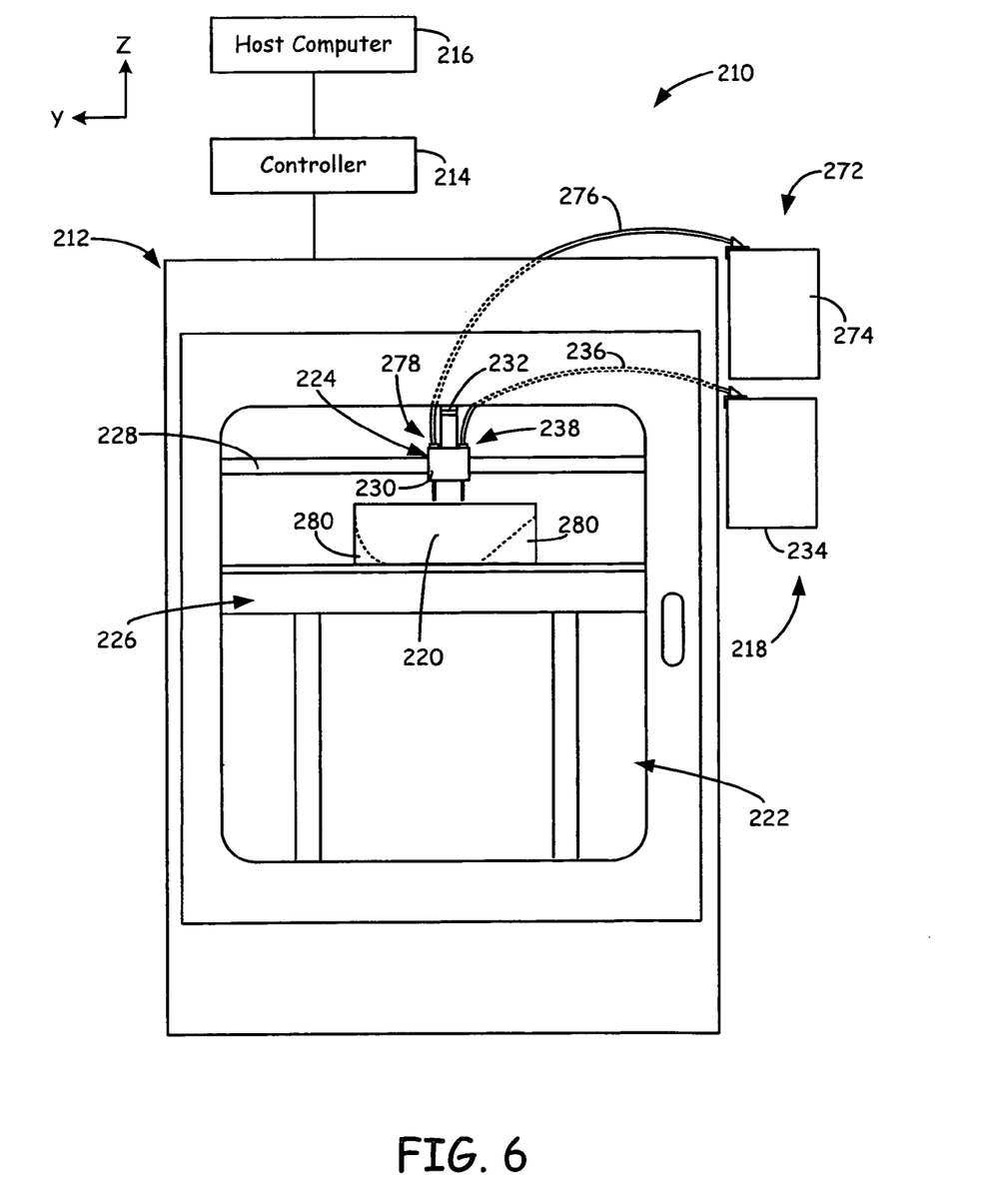
FIG. 6 is a front perspective view of an alternative unit for building 3D objects with multiple consumable assemblies.

FIG. 6 is a front view of unit 210 for building 3D objects with one or more consumable assemblies, and is an alternative embodiment to unit 10 (shown in FIG. 1). Respective reference labels are increased by "200". As shown in FIG. 6, unit 210 further includes consumable assembly 272, which is a second consumable assembly mounted in a loading bay (not shown) of system 212. Consumable assembly 272 includes container portion 274, guide tube 276, and pump portion 278, which engage system 212 in the same manner as consumable assembly 218. Accordingly, pump portion 278 is also retained by extrusion mount 230, thereby providing a dual-extrusion head for system 212. As such, consumable assembly 272 may contain a second material filament that may be the same or a different composition to the build material filament of consumable assembly 218. In one embodiment, consumable assembly 272 contains a support material filament for building support structure 280, thereby providing vertical support along the z-axis for the layers of 3D object 220. In an alternative embodiment, consumable assembly 272 may contain the same build material filament as contained by consumable assembly 218, thereby allowing system 12 to switch from consumable assembly 218 to consumable assembly 272 when the filament supply of consumable assembly 218 runs low. This allows the build operation to continue even when consumable assembly 218 runs out of the build material filament. In one embodiment, extrusion mount 230 includes a toggle mechanism to toggle between the operations of pump portion 238 and pump portion 278.

Figure 7:
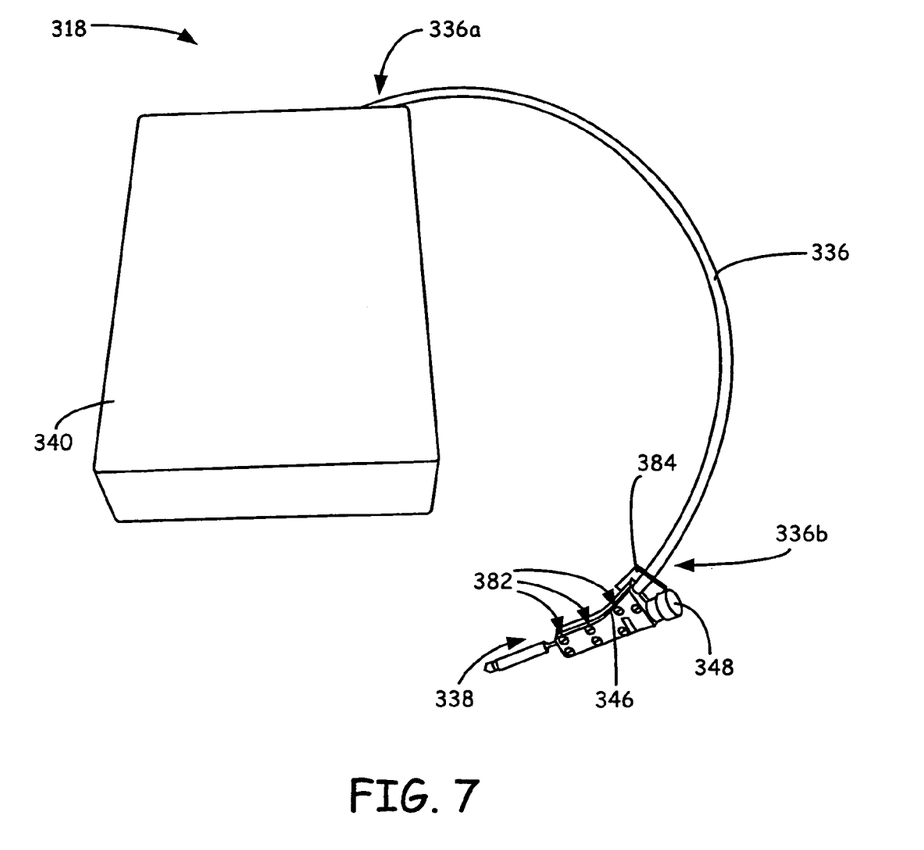
FIG. 7 is a perspective view of a second alternative consumable assembly.

FIGS. 7-13 are schematic illustrations of consumable assembly 318, which is similar to and is an exemplary embodiment of consumable assembly 18 (shown in FIGS. 1-4), where the respective reference labels are increased by "300". FIG. 7 is a perspective view of consumable assembly 318, where outer casing 340 of container portion 334 is fabricated from a wine box, which provides structural protection and moisture resistance. As further shown, pump portion 338 includes bolts 382 and bracket 384. Bolts 382 are bolts that secure casing 346 of pump portion 338 in a closed state. Bracket 382 is secured to casing 346 via one of bolts 382, and enwraps a portion of first end 336a of guide tube 336. This positions first end 336a of guide tube 336 at a desired angle relative to casing 346 for feeding the build material filament from guide tube 336 to pump portion 338.

Figure 8:
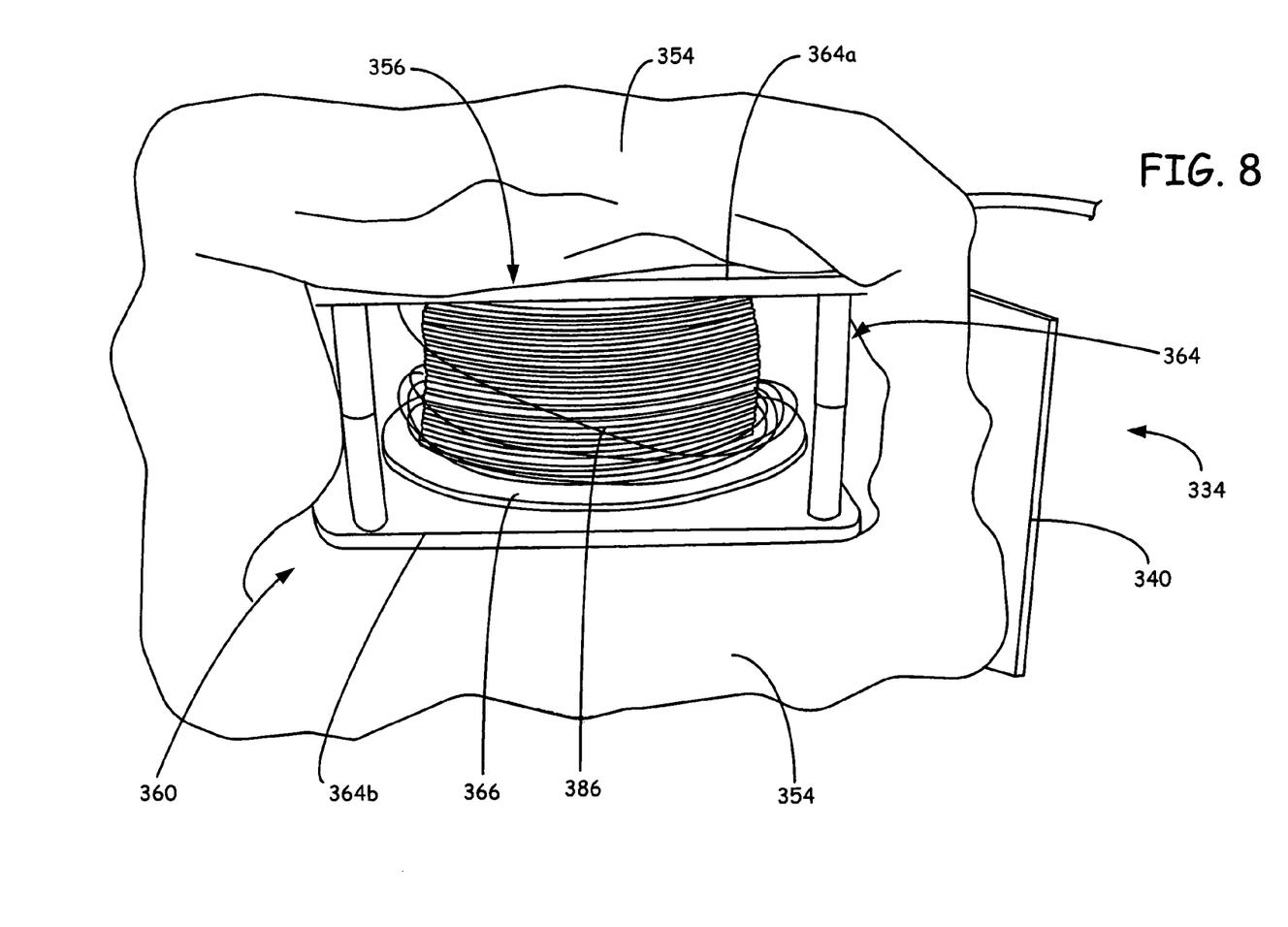
FIG. 8 is a bottom view of a container portion of the second alternative consumable assembly, where a bottom of the container portion is open.

FIG. 8 is a bottom view of container portion 334, where the bottom portion of outer casing 340 (i.e., opening 360) and liner 354 are open for access to spool assembly 356. As shown, filament 386 is wound around filament spool 366, where filament 386 may be any type of material for building a 3D object or support structure with system 12. Examples of suitable build materials for filament 386 include any type of extrudable thermoplastic material, such as acrylonitrile-butadiene-styrene (ABS), polycarbonate, polyphenylsulfone, polysulfone, nylon, polystyrene, amorphous polyamide, polyester, polyphenylene ether, polyurethane, polyetheretherketone, copolymers thereof, and combinations thereof. Examples of suitable support materials for filament 386 include silicone-doped thermoplastic materials, and water-soluble materials commercially available under the trademarks "WATERWORKS" and "SOLUBLE SUPPORTS" from Stratasys, Inc., Eden Prairie, Minn.

Figure 9:
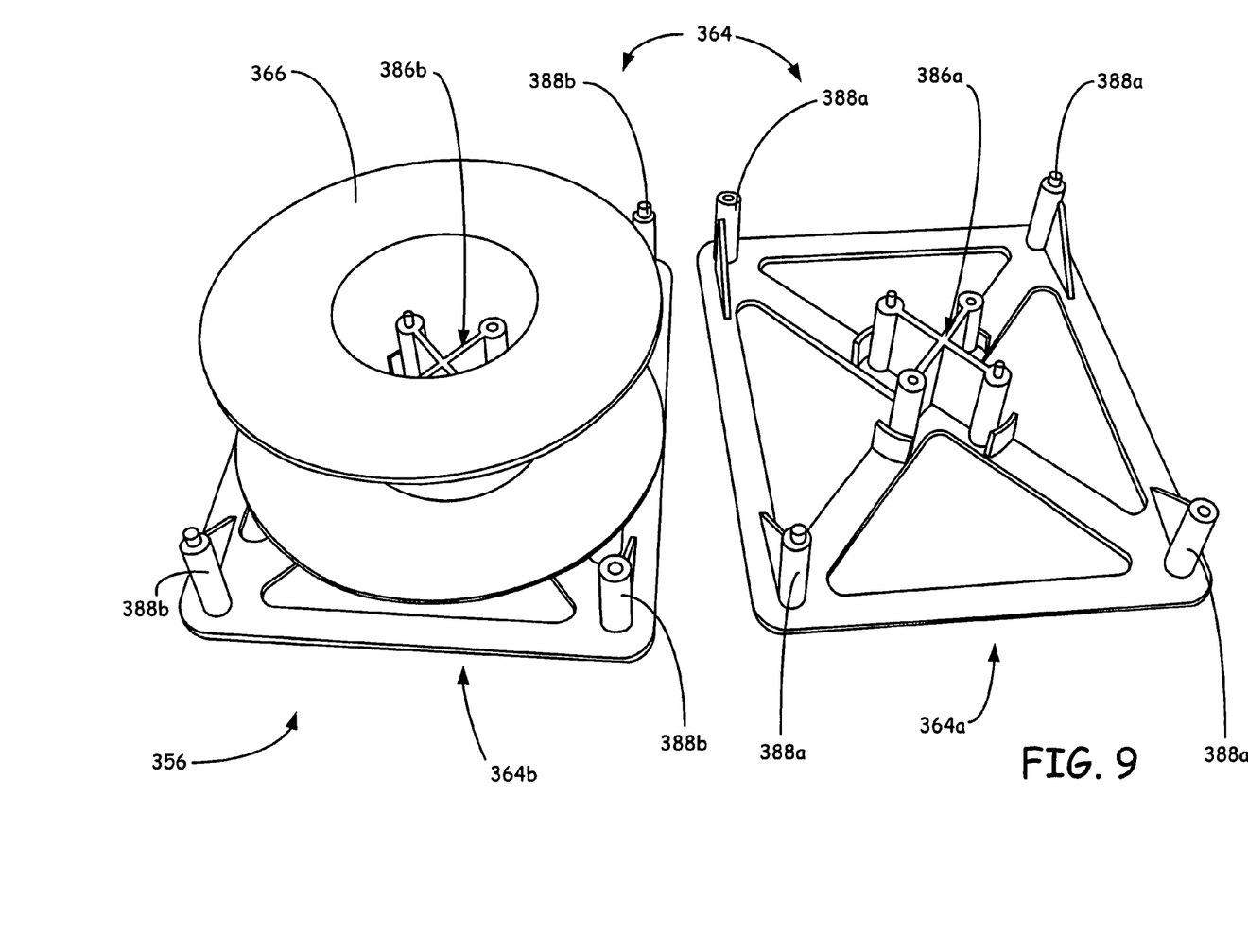
FIG. 9 is a perspective view of a spool assembly of the second alternative consumable assembly, where the spool assembly is partially disassembled.

FIG. 9 is a perspective view of spool assembly 366 (with filament 386 omitted) where frame component 364a is removed. As shown, frame component 364a includes axial connection point 386a and perimeter connection points 388a, and frame component 364b includes axial connection point 386b and perimeter connection points 388b. During assembly, filament spool 366 is mounted onto axial connection point 386b, and frame component 364a is closed over filament spool 366. Accordingly, frame portions 364a and 364b are secured together at axial connection points 386a and 386b, and at perimeter connection points 388a and 388b.

Figure 10:
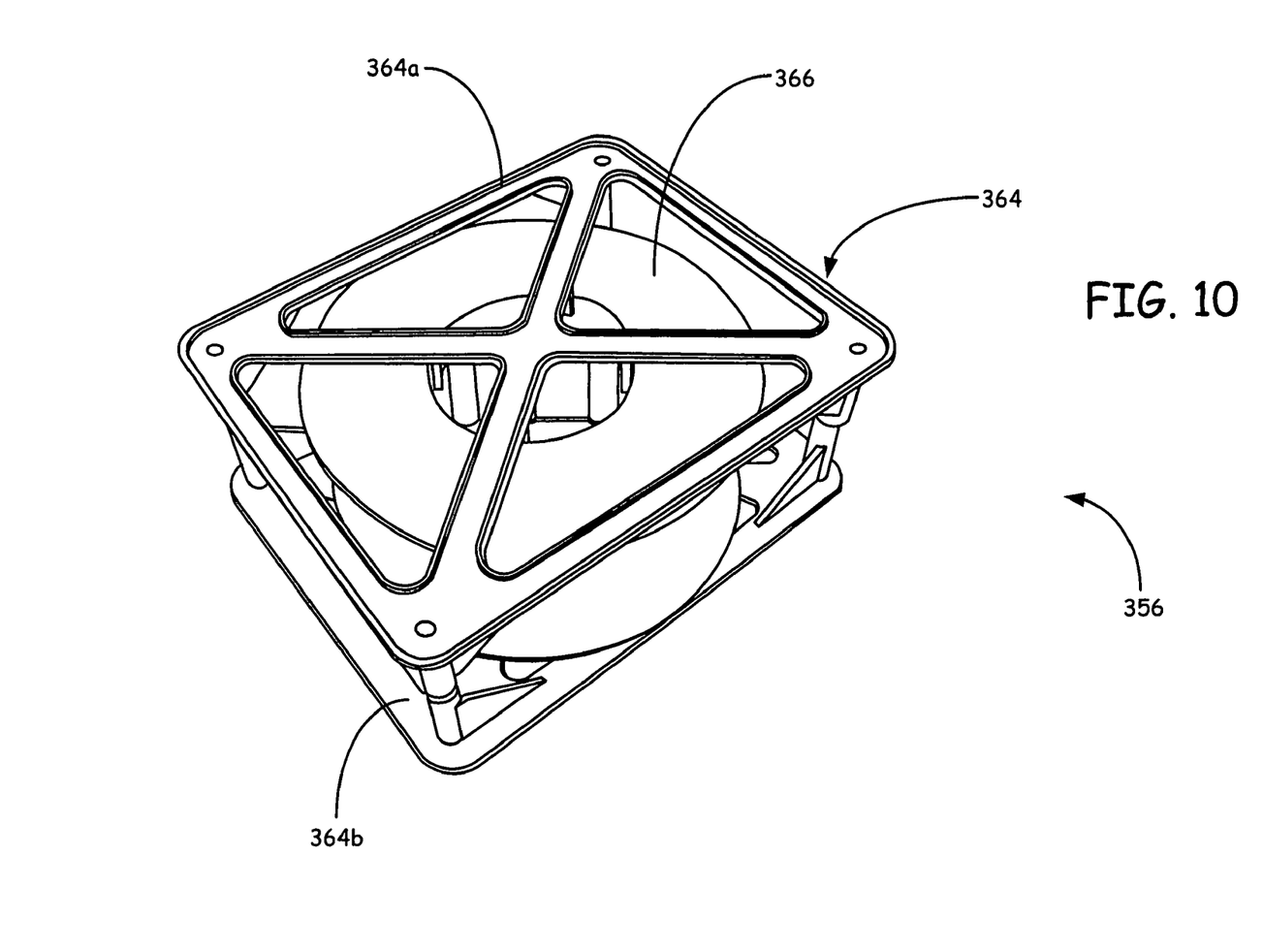
FIG. 10 is a perspective view of the spool assembly of the second alternative consumable assembly.

FIG. 10 is a perspective view of spool assembly 366 (with filament 386 omitted), where frame portions 364a and 364b are secured together. As shown, when frame components 364a and 364b of spool frame 364 are secured together, filament spool 366 is rotatably secured between frame components 364a and 364b, thereby allowing filament spool 366 to freely rotate.

Figure 11:
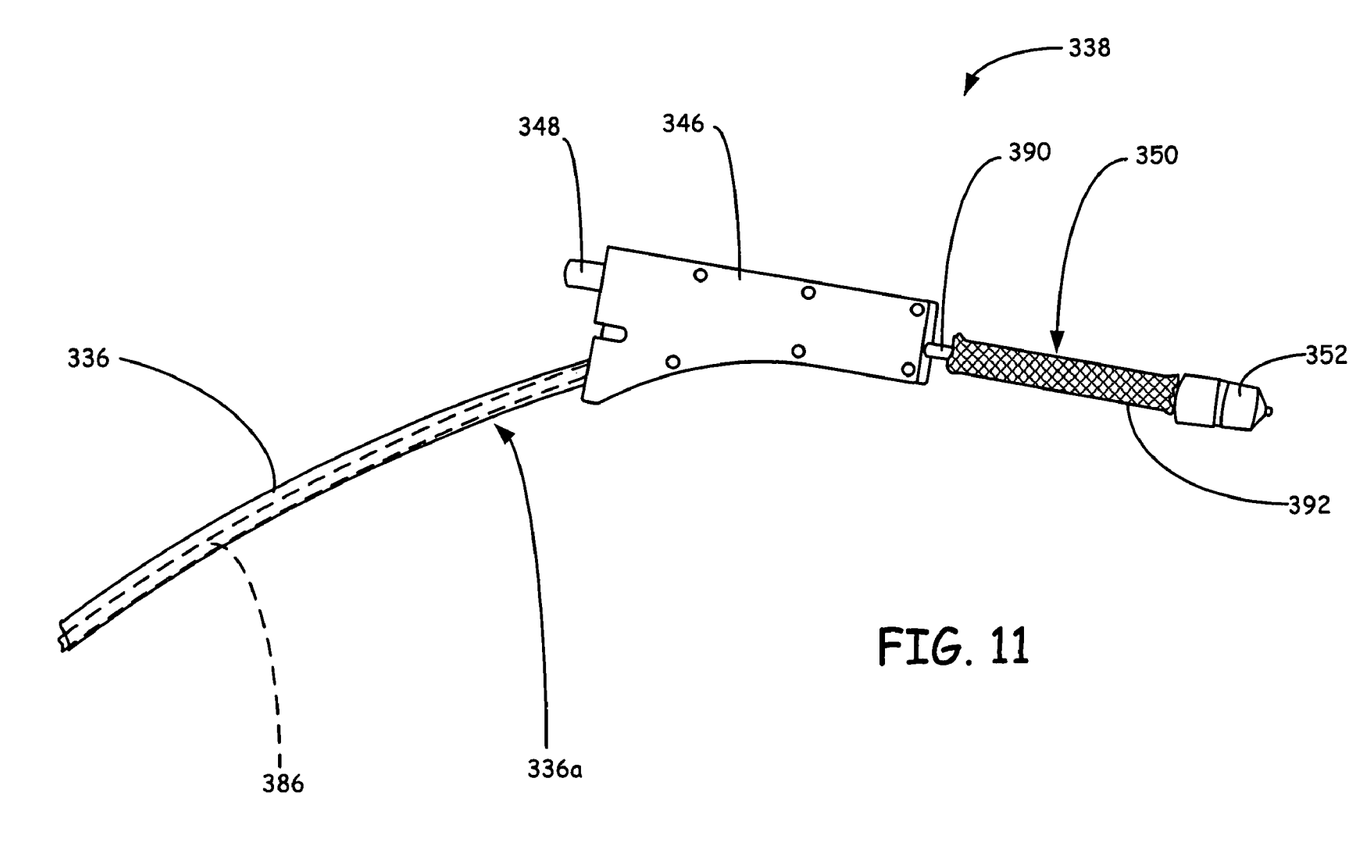
FIG. 11 is a top perspective view of a guide tube and a pump portion of the second alternative consumable assembly.

FIG. 11 is a top perspective view of guide tube 336 and pump portion 338, which further illustrates the components of liquefier region 350. As shown, liquefier region 350 includes liquefier tube 390 and insulated heater 392. Liquefier tube 390 is a thermally-conductive (e.g., metallic) tube that extends between casing 346 and extrusion tip 352, and is the region in which filament 386 is melted. Insulated heater 392 includes a heater (e.g., wire coil heaters and thermal blocks) extending around liquefier tube 290, and a thermally-insulative sleeve extending around the heater. As discussed above, the heater is electrically connected to a power source from system 12.

Figure 12:
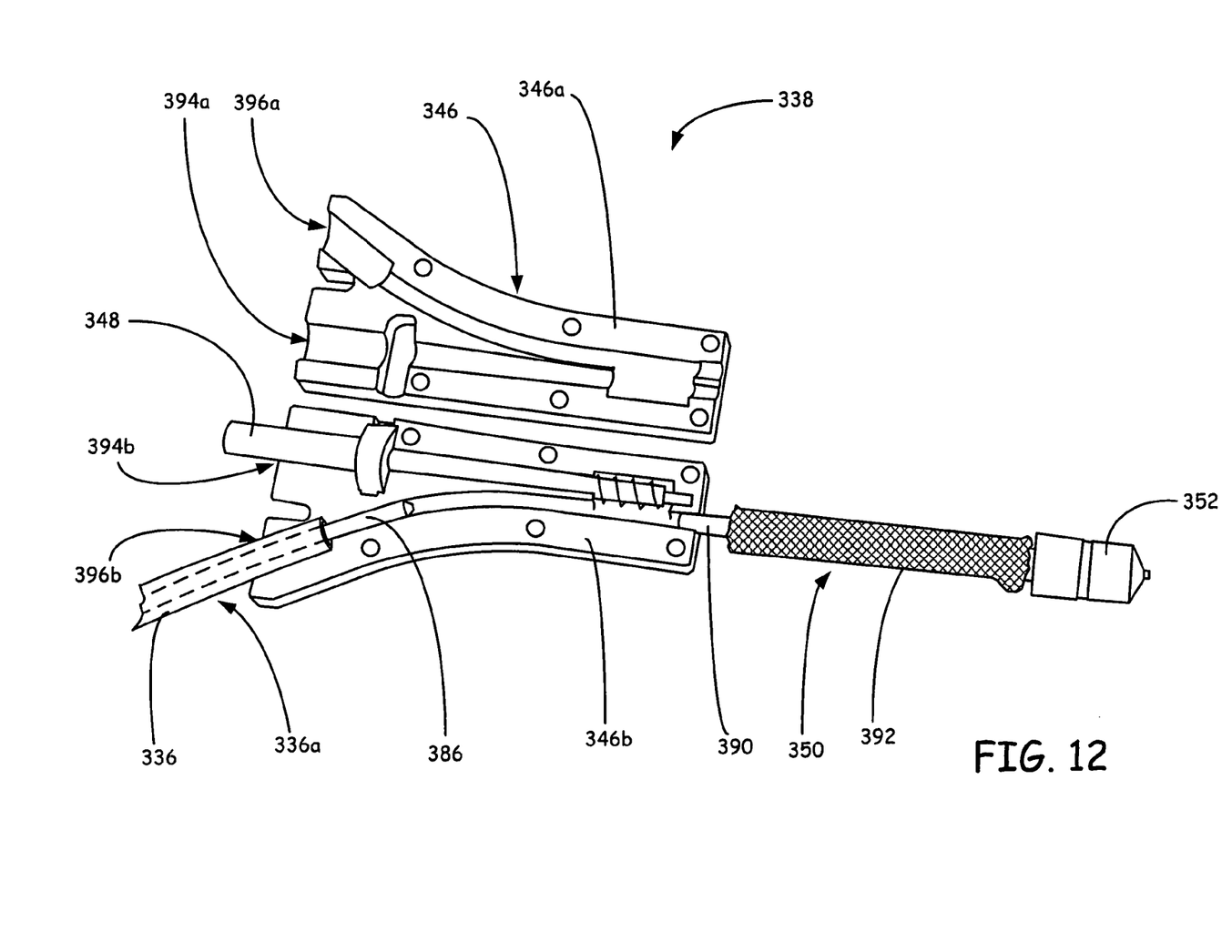
FIG. 12 is top perspective view of the guide tube and the pump portion of the second alternative consumable assembly, where a casing of the pump portion is open.
Figure 13:
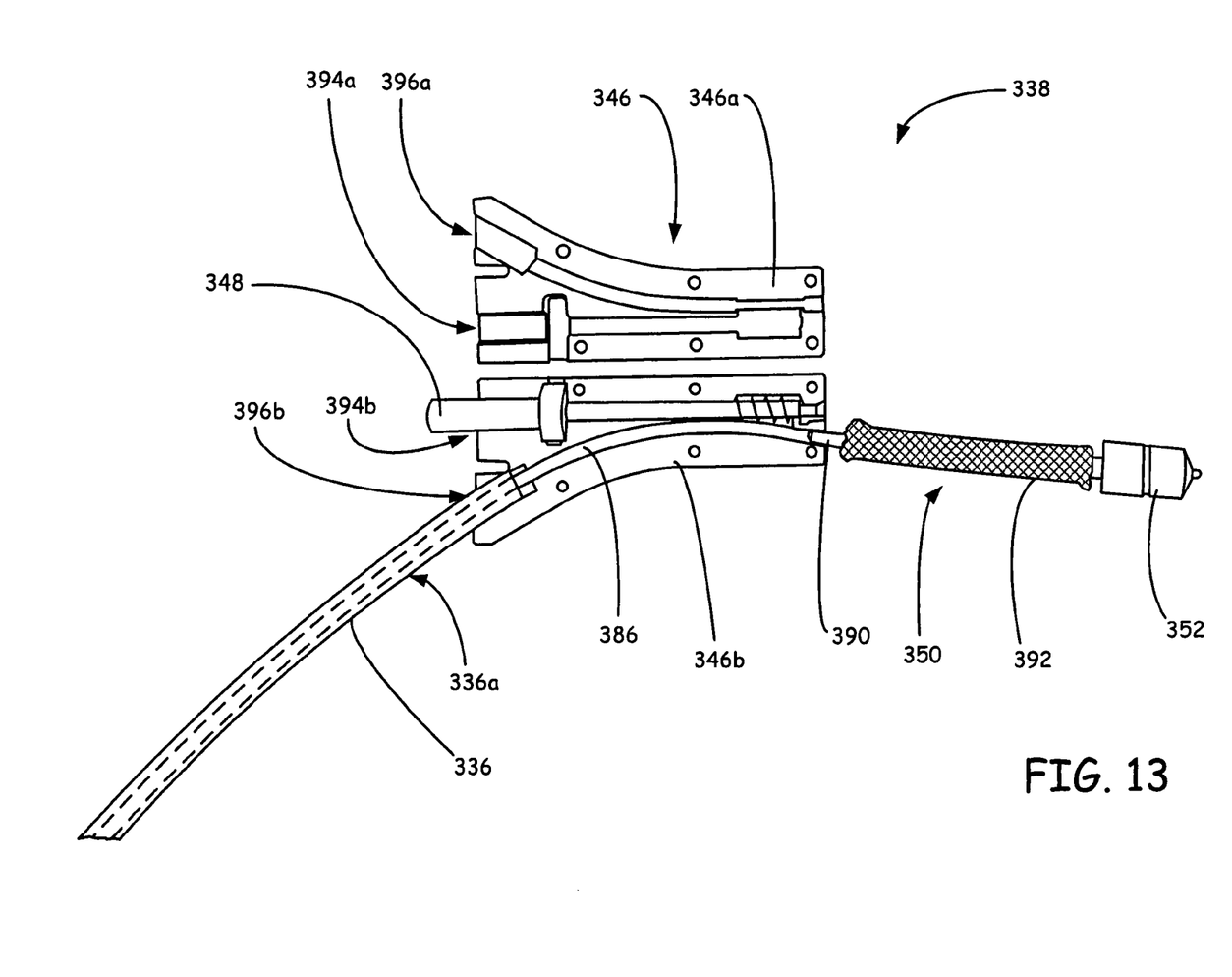
FIG. 13 is top perspective view of the guide tube and the pump portion of the second alternative consumable assembly, where a casing of the pump portion is open and a filament is fully inserted.

FIGS. 12 and 13 are top perspective views of guide tube 336 and pump portion 338, where casing 346 is open to illustrate the internal arrangement of casing 346. As shown in FIG. 12, casing 346 includes first portion 346a, second portion 346b, and connector 392, where connector 392 interconnects first portion 346a and second portion 346b. This allows first portion 346a and second portion 346b to close together to define casing 346. Suitable materials for fabricating first portion 346a, second portion 346b, and connector 392 include polymeric materials, such as those discussed above for guide tube 36 (shown in FIGS. 2 and 3). First portion 346a includes drive mechanism cavity 394a and filament pathway cavity 396a, and second portion 346b includes drive mechanism cavity 394b and filament pathway cavity 396b. When first portion 346a and second portion 346b are closed together, drive mechanism cavities 394a and 394b define an internal chamber for rotatably retaining drive mechanism 348, and filament pathway cavities 396a and 396b define a pathway for feeding filament 386 from guide tube 336 to liquefier tube 390.

As further shown in FIG. 12, filament 386 is fed from guide tube 336 and into the pathway defined by filament pathway cavities 396a and 396b. As shown in FIG. 13, while filament 386 is disposed in the pathway, drive mechanism 348 engages with filament 386, thereby feeding successive portions of filament 386 to liquefier tube 390. The heater of insulated heater 392 then melts the material of filament 386, thereby allowing the melted material to extrude from extrusion tip 352 to build a 3D object or corresponding support structure. As discussed above, the components of pump portion 338 remove several of the components from system 12 that may degrade or otherwise have reduced efficiencies over multiple extrusion runs (e.g., liquefier tube 390, insulated heater 392, drive mechanism 348, and extrusion tip 352). This allows new components to be used with each consumable assembly 318 that is loaded into system 12.

Although the present disclosure has been described with reference to preferred embodiments, workers skilled in the art will recognize that changes may be made in form and detail without departing from the spirit and scope of the disclosure.

The invention claimed is:

1. A consumable assembly for use in an extrusion-based layered deposition system, the consumable assembly comprising:
    a pump portion configured to be inserted in a mount of the extrusion-based layered deposition system to extrude a material of a filament in a molten state, wherein the pump portion comprises an electrical connection configured to receive electrical power from the extrusion-based layered deposition system when the pump portion is inserted in the mount;
    a container portion configured to retain a supply of the filament, wherein the container portion is configured to be offset from the pump portion when the pump portion is inserted in the mount; and
    a guide tube interconnecting the container portion and the pump portion, wherein the guide tube is configured to guide the filament from the container portion to the pump portion;
    wherein the pump portion, the guide tube, and the container portion are configured to be removed together from use with the extrusion-based layered deposition system.

2. The consumable assembly of claim 1, wherein the container portion comprises:
    an outer casing; and
    at least one liner disposed within the outer casing.

3. The consumable assembly of claim 2, wherein the container portion further comprises a spool assembly disposed within the at least one liner, the spool assembly being the component of the container portion that retains the supply of the filament.

4. The consumable assembly of claim 1, wherein the container portion comprises at least one data chip configured to communicate with an extrusion-based layered deposition system when the consumable assembly is loaded to the extrusion-based layered deposition system.

5. The consumable assembly of claim 1, wherein the pump portion comprises a drive mechanism configured to feed successive portions of the filament.

6. The consumable assembly of claim 5, wherein the pump portion further comprises:
- a liquefier component configured to at least partially melt the successive portions of the filament fed by the drive mechanism to provide the material of the filament in the molten state; and
- an extrusion tip disposed downstream from the liquefier component, and configured to provide an exit location for extruding the material of the filament in the molten state.

7. The consumable assembly of claim 5, wherein the pump portion further comprises a motor configured to operate the drive mechanism.

8. The consumable assembly of claim 1, wherein the supply of the filament in the container portion comprises a coil of the filament.

9. The consumable assembly of claim 1, and further comprising the supply of filament, wherein the filament comprises:
- a first portion being the portion of the filament that is retained in the container portion;
- a second portion extending through the guide tube; and
- a third portion extending at least partially through the pump portion.

10. The consumable assembly of claim 9, wherein the pump portion comprises a drive mechanism that is engaged with the third portion of the filament.

11. A consumable assembly for use in an extrusion-based layered deposition system, the consumable assembly comprising:
- a pump portion wherein the pump portion is configured to be inserted in a mount of the extrusion-based layered deposition system, wherein the pump portion comprises an electrical connection configured to receive electrical power from the extrusion-based layered deposition system when the pump portion is inserted in the mount;
- a container portion configured to be offset from the pump portion when the pump portion is inserted in the mount;
- a guide tube interconnecting the container portion and the pump portion; and
- a supply of filament comprising:
  - a first portion retained in the container portion;
  - a second portion extending through the guide tube; and
  - a third portion extending at least partially through the pump portion;
- wherein the pump portion, the guide tube, and the container portion are configured to be removed together from use with the extrusion-based layered deposition system.

12. The consumable assembly of claim 11, wherein the container portion comprises:
- an outer casing; and
- at least one liner disposed within the outer casing, wherein the first portion of the filament is retained within the at least one liner.

13. The consumable assembly of claim 12, wherein the container portion further comprises a spool assembly disposed within the at least one liner, the spool assembly being the component of the container portion that retains the first portion of the filament.

14. The consumable assembly of claim 11, wherein the pump portion comprises a drive mechanism that is engaged with the third portion of the supply of filament.

15. The consumable assembly of claim 14, wherein the pump portion further comprises:
- a liquefier component configured to at least partially melt the successive portions of the filament fed by the drive mechanism to provide the material of the filament in a flowable state; and
- an extrusion tip disposed downstream from the liquefier component, and configured to provide an exit location for extruding the material of the filament in the flowable state.

16. A consumable assembly for use in an extrusion-based layered deposition system, the consumable assembly comprising:
- a filament;
- a container portion, wherein a first portion of the filament is retained in the container portion; and
- a flexible guide tube having a first end engaged with the container portion, and a second end, wherein a second portion of the filament extends through the guide tube; and
- a pump portion configured to be inserted in a mount of the extrusion-based layered deposition system, wherein the pump portion comprises:
  - a casing connected to the second end of the flexible guide tube, wherein a third portion of the filament extends at least partially through the casing;
  - a liquefier component extending from the casing; and
  - an electrical connection configured to receive electrical power from the extrusion-based layered deposition system when the pump portion is inserted in the mount;
- wherein the container portion is configured to be offset from the pump portion when the pump portion is inserted in the mount; and
- wherein the pump portion, the guide tube, and the container portion are configured to be removed together from use with the extrusion-based layered deposition system.

17. The consumable assembly of claim 16, wherein the container portion further comprises a spool assembly, the spool assembly being the component of the container portion that retains the first portion of the filament.

18. The consumable assembly of claim 16, wherein the first portion of the filament is coiled in the at least one liner without a spool.

19. The consumable assembly of claim 16, wherein the pump portion further comprises:
- a filament drive mechanism retained by the casing; and
- a motor retained by the casing and engaged with the filament drive mechanism.

20. The consumable assembly of claim 19, wherein the motor is engaged with the filament drive mechanism in a worm gear manner.

21. The consumable assembly of claim 16, wherein the container portion comprises:
- at least one liner, wherein the first portion of the filament is retained in the at least one liner; and
- a tube connector, wherein the first end of the flexible guide tube is engaged with the container portion at the tube connector to provide a moisture seal.

22. The consumable assembly of claim 1, wherein the pump portion comprises:
- a filament drive mechanism; and
- a motor engaged with the filament drive mechanism in a worm gear manner.

* * * * *